United States Patent [19]

Ida

[11] Patent Number: 4,701,605
[45] Date of Patent: Oct. 20, 1987

[54] APPARATUS AND METHOD FOR DETECTING FOCUS CONDITION OF AN IMAGING OPTICAL SYSTEM

[75] Inventor: Masatoshi Ida, Hachioji, Japan
[73] Assignee: Olympus Optical Co., Ltd., Japan
[21] Appl. No.: 828,708
[22] Filed: Feb. 12, 1986

Related U.S. Application Data

[62] Division of Ser. No. 502,546, Jun. 9, 1983.

[30] Foreign Application Priority Data

Jun. 14, 1982 [JP] Japan ............................. 57-100759
Jul. 2, 1982 [JP] Japan ............................. 57-114915
Jul. 20, 1982 [JP] Japan ............................. 57-126273

[51] Int. Cl.$^4$ .............................................. G01J 1/36
[52] U.S. Cl. ................................ 250/201; 250/204; 354/407
[58] Field of Search .............. 250/201 AF, 201 PF, 250/201 DF, 201 R, 204, 578, 237 R; 354/406, 407, 408, ; 356/1, 4

[56] References Cited

U.S. PATENT DOCUMENTS

| | | | |
|---|---|---|---|
| 3,856,400 | 12/1974 | Hartmann | 250/237 G |
| 4,047,022 | 9/1977 | Holle | 250/201 |
| 4,383,170 | 5/1983 | Takagi et al. | 350/578 |
| 4,492,449 | 1/1985 | Oinoue et al. | 250/204 |
| 4,593,188 | 6/1986 | Ida | 250/204 |

*Primary Examiner*—Edward P. Westin
*Assistant Examiner*—Charles F. Wieland
*Attorney, Agent, or Firm*—Parkhurst & Oliff

[57] ABSTRACT

An apparatus and method for detecting focus condition of an imaging optical system is disclosed. The apparatus comprises means for dividing a light flux transmitted through the imaging optical system into two sub-light fluxes, first and second light receiving element arrays disposed in front of and at the rear of a predetermined focal plane or a plane conjugated therewith and each having a plurality of light receiving elements, a light flux dividing optical system arranged at the light incident side of the light receiving element arrays for partially cutting incident light and constructed in such a manner that images projected upon respective light receiving element arrays by respective light fluxes transmitted mainly through first and second regions of the imaging optical system, which are divided by a plane including an optical axis of the imaging optical system, are shifted in the array direction in accordance with the amount of defocused condition, means for obtaining first and second evaluation functions representing image sharpness and third and fourth evaluation functions representing image lateral shift by processing outputs of the first and second light receiving element arrays, and means for deciding the defocused condition and the in-focused condition by arithmetically operating all evaluation functions.

5 Claims, 16 Drawing Figures

FIG_7
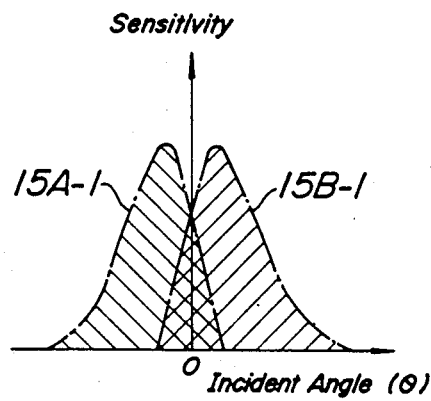
FIG_8a
FIG_8b
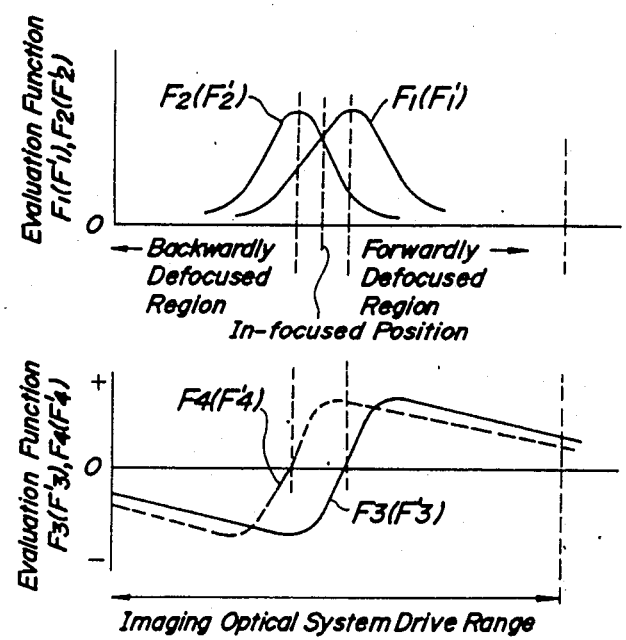

FIG_11
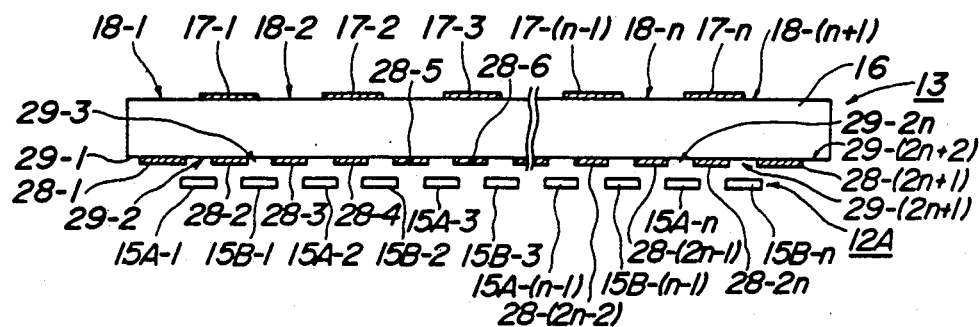
FIG_12
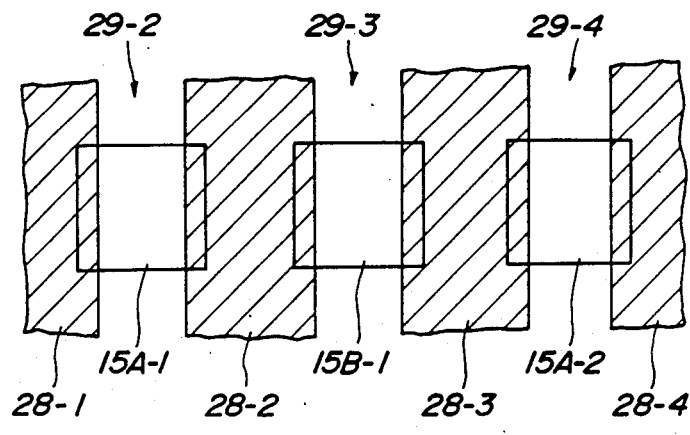

APPARATUS AND METHOD FOR DETECTING FOCUS CONDITION OF AN IMAGING OPTICAL SYSTEM

This is a division of application Ser. No. 502,546 filed June 9, 1983.

BACKGROUND OF THE INVENTION

The present invention relates to an apparatus and a method for detecting a focus condition of an optical system such as a camera, a microscope or the like.

Two methods have been developed for detecting an in-focused condition of an object image formed by an imaging optical system, one being an image sharpness detection method and the other being a lateral shift detection method. FIG. 1 shows an example of applying a focus condition detecting device for carrying out such an image sharpness detection method to a single-lens reflex camera. In FIG. 1, a part or whole of a light flux transmitted through an imaging lens 1 is divided into two parts by a quick-return mirror 3 having a part thereof formed as a half-mirror 2. One of the divided light fluxes is directed to a finder system including a focusing screen 4, a penta prism 5 or the like, and the other part thereof is directed to a beam splitter 7 by a total reflection mirror 6 which is arranged behind the quick-return mirror 3, after transmitting through the half mirror 2. The beam splitter 7 furthermore divides received light flux into two parts and respective subdivided light fluxes are imaged upon two light receiving element arrays 9a and 9b which are disposed at positions separated by a constant distance on both sides of a plane conjugated with a predetermined focal plane 8 (film plane) of the imaging lens 1.

In the construction thus formed, assuming that an output of one light receiving element array is $X_n$, the following equation may be obtained.

$$S = |X_n - X_{n-1}|_{MAX} + |X_n - X_{n-1}|_{SUBMAX}$$

wherein S is an evaluation value relating to a sharpness of image which varies in accordance with the amount of sharpness thereof.

For outputs of two light receiving element arrays 9a and 9b, assuming that evaluation values S obtained by the above equation are $S_1$ and $S_2$, respectively, evaluation values $S_1$ and $S_2$ are changed as shown in FIG. 2 for defocusing. When the difference between the values $S_1$ and $S_2$ is observed, the defocusing direction and the in-focused position can be detected as a forwardly-defocused condition for $S_1 < S_2$, a backwardly-defocused condition for $S_1 > S_2$ and an in-focused condition for $S_1 = S_2$.

The above described conventional method is capable of detecting in-focused condition with high precision by utilizing a comparatively simple optical system. As is shown in FIG. 2, however, in the condition of largely shifting the imaging plane of the imaging lens 1 from a predetermined in-focused position, the difference between evaluation values $S_1$ and $S_2$ becomes very small and then it is difficult to compare both evaluation values $S_1$ and $S_2$ with each other, so that it is possible to detect the in-focused condition, the forwardly-defocused condition and the backwardly-defocused condition only in a limited lens drive range, but it is very difficult to detect the in-focused condition over whole imaging optical system drive range.

An example of the conventional lateral shift detection method is shown in FIG. 3, in which like elements are designated by the same reference characters as that shown in FIG. 1. In an in-focused condition detecting device for carrying out the lateral shift detection method, a light flux of an object (not shown) reflected by the total reflection lens 6 through the imaging lens 1 and the half mirror 2 of the quick-return mirror 3 is incident upon a light receiving element array 11 disposed at a plane substantially optically conjugated with an exit pupil plane of the imaging lens 1 through an auxiliary optical system 10 such as a lenticular lens or the like disposed at a plane conjugated with or near thereof the predetermined focal plane of the lens i.e., the film plane 8. As shown in FIG. 4 the light receiving element array 11 comprises first and second light receiving element groups 11A and 11B each having light receiving elements 11A-1 to 11A-n and 11B-1 to 11B-n, respectively, and respective corresponding light receiving elements constitute light receiving element pairs 11A-1, 11B-1; ...; 11A-n, 11B-n. Whole light receiving elements are arranged to position them in a straight line. The auxiliary optical system 10 comprises n auxiliary optical elements corresponding to light receiving element pairs 11A-1, 11B-1; ...; 11A-n, 11B-n, and two light receiving elements forming respective light receiving element pairs are so arranged that they receive images transmitted through portions of the exit pupil plane of the imaging lens 1 which are placed at either side of a plane including the optical axis of the imaging lens 1 and perpendicular to an array direction of light receiving element (a plane perpendicular to the paper and including an optical axis in FIG. 3), that is, upper and lower parts of the exit pupil plane which are defined by the optical axis in FIG. 3.

In the construction thus formed as shown in FIG. 3 when at least a part of an object image is incident upon the light receiving element array 11 through the imaging lens 1 and the auxiliary optical system 10, the light receiving element group 11A receives only light flux transmitted through the lower part of the imaging lens 1 and the light receiving element group 11B receives only light flux transmitted through the upper part of the lens 1 so that illumination distributions of the image incident upon the light receiving element groups 11A and 11B coincide with each other in the in-focused condition and shifts laterally in the opposite directions in accordance with the shifting directions in the defocused condition. In the focus condition detecting device shown in FIG. 3, outputs of light receiving element groups 11A and 11B are so processed that lateral shift direction of the image is detected and thus respective focus conditions such as the forwardly- and backwardly-defocused conditions and the in-focused condition are detected based thereon.

Such a focus condition detecting device according to the lateral shift detection method has the advantage that a possible focus condition detecting range becomes larger than that of the image sharpness detection method shown in FIG. 1. On the other hand, a gain of lateral shift signal becomes small near the in-focused position and the construction thereof becomes complex so that it is difficult to manufacture the auxiliary optical system 10 such as the lenticular lens or the like in the conventional focus condition detecting device shown in FIG. 3 and thus the whole device becomes expensive and large resulting in difficulty in optically adjusting the respective auxiliary optical system and light receiving element pairs corresponding thereto.

SUMMARY OF THE INVENTION

It is an object of the present invention to eliminate the above described disadvantages of the conventional focus condition detecting apparatus.

It is another object of the present invention to provide a focus condition detecting apparatus having simple construction and the advantages of both the image sharpness detection method and the lateral shift detection method.

According to the present invention there is provided an apparatus for detecting a focus condition of an imaging optical system comprising means for dividing a light flux transmitting through the imaging optical system into two sub-light fluxes;

first and second light receiving element arrays disposed in front of and at the rear of a predetermined focal plane or a plane conjugated therewith and each having a plurality of light receiving elements;

a light flux dividing optical system arranged at the light incident side of the light receiving element arrays and constructed in such a manner that images projected upon respective light receiving element arrays by respective light fluxes transmitted mainly through first and second regions of the imaging optical system which are divided by a plane including an optical axis of the imaging optical system, are shifted in the array direction in accordance with the amount of defocused condition;

means for obtaining evaluation functions $F_1$ and $F_2$ representing image sharpness and evaluation functions $F_3$ and $F_4$ representing image lateral shift by processing outputs of the first and second light receiving element arrays; and means for deciding the defocused condition and the in-focused condition by arithmetically operating the evaluation functions $F_1$ to $F_4$.

The light flux dividing optical system is a light shielding member for cutting incident light. The light shielding member is a stripe mask plate comprising a transparent substrate, and a plurality of first stripe masks provided on the light incident surface of the substrate at equal intervals in such a manner that intervals between first stripe masks form a plurality of openings for making light fluxes transmitted through the first and second regions of the imaging optical system incident upon the adjacent light receiving elements of respective light receiving element arrays. The stripe mask plate further comprises a plurality of second stripe masks arranged to situate between successive light receiving elements of the light receiving element arrays on the surface of the transparent substrate remote from the first stripe mask, said surface being very near the light receiving element arrays, in such a manner that the first and second stripe masks ensure incident of the divided light fluxes by the first stripe mask upon the adjacent paired light receiving elements.

The focus condition detecting apparatus further comprises a plurality of third light receiving elements provided between respective paired light receiving elements formed by two adjacent light receiving elements of respective light receiving element arrays in such a manner that the third light receiving elements receive light fluxes transmitted through both first and second regions of the imaging optical system, and means for obtaining evaluation functions $F'_1$ and $F'_2$ representing image sharpness by processing outputs of the third light receiving elements of the first and second light receiving element arrays.

According to the present invention there is provided a method of detecting a focus condition of an imaging optical system comprising the steps of:

dividing a light flux transmitted through the imaging optical system into two sub-light fluxes;

providing first and second light receiving element arrays in front of and at the rear of a predetermined focal plane or a plane conjugated therewith and each having a plurality of light receiving elements;

providing a light flux dividing optical system at the light incident side of the light receiving element arrays in such a manner that images projected upon respective light receiving element arrays by respective light fluxes transmitted through first and second regions of the imaging optical system which are defined by a plane including an optical axis of the imaging optical system are shifted in the array direction in accordance with the amount of defocused condition;

obtaining evaluation functions $F_1$ and $F_2$ representing image sharpness and evaluation functions $F_3$ and $F_4$ representing image lateral shift by processing outputs of the first and second light receiving element arrays; and deciding the defocused condition and the in-focused condition by arithmetically operating the evaluation functions $F_1$ to $F_4$.

BRIEF DESCRIPTION OF THE DRAWINGS

FIG. 7 is a graph showing a directional characteristic of the adjacent paired light receiving elements of the same light receiving element array;

FIGS. 8a and 8b are graphs showing various modes of detected signals representing focus conditions;

FIG. 11 is a side view showing a light shielding member for use in the focus condition detecting apparatus according to the present invention; and FIG. 12 is a plan view illustrating a relative position between a second light shielding member and a light receiving element array shown in FIG. 11.

DESCRIPTION OF THE PREFERRED EMBODIMENTS

Figure 1:
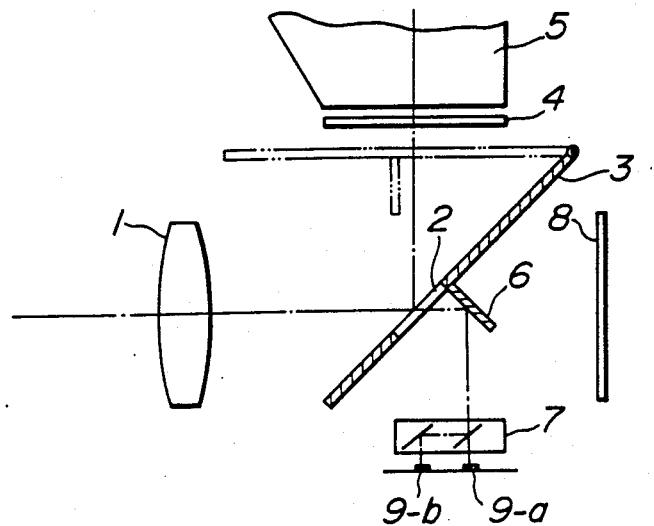
FIG. 1 is a schematic view showing a conventional focus condition detecting apparatus based on an image sharpness detection method.
Figure 2:
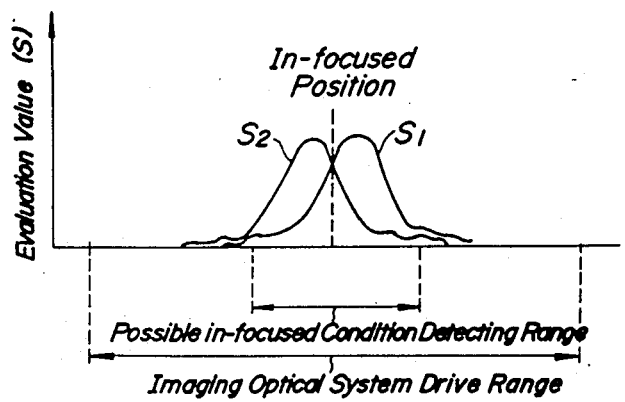
FIG. 2 is a graph illustrating a change in defocusing directions of an evaluation value representing sharpness of the image obtained by the apparatus shown in FIG. 1.
Figure 3:
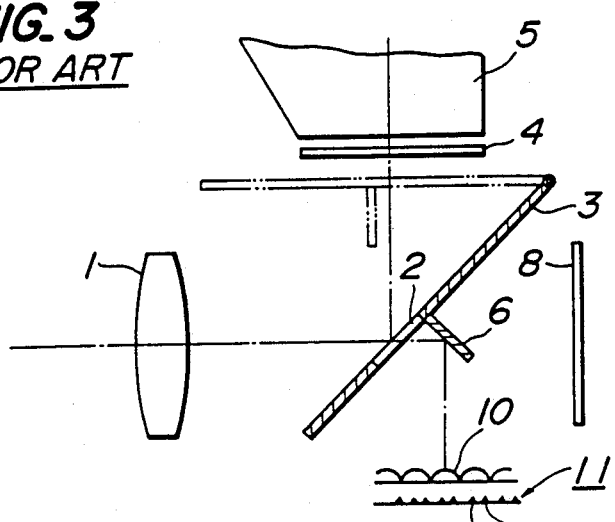
FIG. 3 is a schematic view showing a conventional focus condition detecting apparatus based on a lateral shift detection method.
Figure 4:
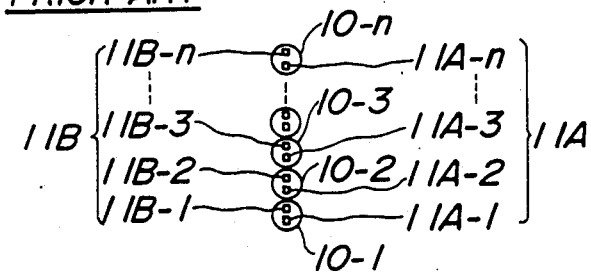
FIG. 4 is a plan view illustrating a relative position between an auxiliary optical system and a light receiving element array shown in FIG. 3.
Figure 5:
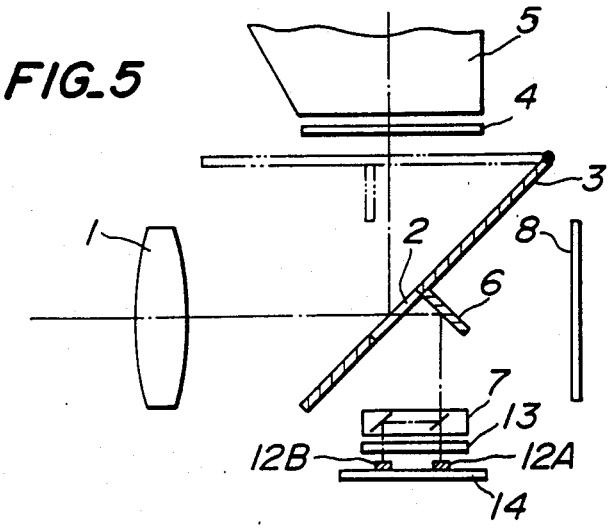
FIG. 5 is a schematic view showing one embodiment of a focus condition detecting apparatus according to the present invention.

FIG. 5 shows a first embodiment of a focus condition detecting apparatus according to the present invention which is applied to a single-lens reflex camera. In FIG. 5 like elements are designated by the same reference characters as that shown in FIG. 1 and its explanations are omitted.

In the focus condition detecting apparatus according to the present invention, first and second light receiving element arrays 12A and 12B are arranged in front of and at the rear of a predetermined focal plane of an imaging optical system, for example, an imaging lens 1 or a plane conjugated therewith so as to receive respective light fluxes from the imaging lens 1. A light flux dividing system 13 is arranged in front of the light receiving surface of the light receiving element arrays 12A and 12B which receive the light flux reflected by reflection mirror 6. That is, in an optical path between light receiving element arrays 12A, 12B and the imaging lens 1, a light flux dividing system, for example, a stripe mask plate 13 which is explained in detail later on, is arranged between respective light receiving element arrays 12A, 12B and a beam splitter 7 in such a manner that light fluxes transmitted through first and second regions which are defined by a plane including the optical axis of the imaging lens 1 are incident upon the paired adjacent light receiving elements of respective light receiving element arrays 12A and 12B, respectively.

Figure 6A:
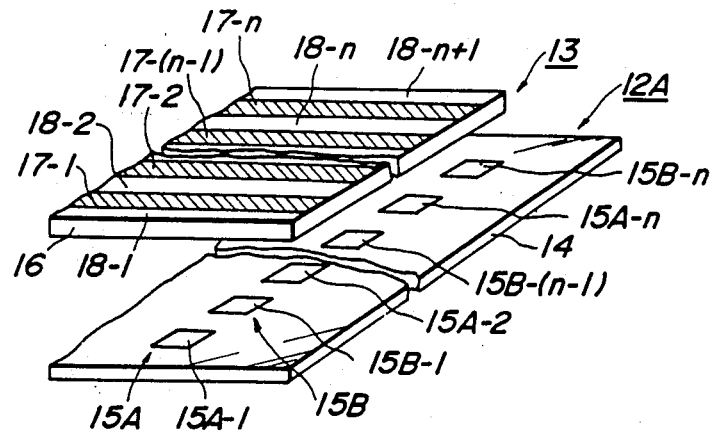
FIGS. 6a, 6b and 6c are a perspective view, a plan view and a side view, respectively, of a construction of a stripe mask and a light receiving element array shown in FIG. 5 and a relative position therebetween.

FIG. 6a is a perspective view showing the light receiving element array 12A and the stripe mask plate 13 used in the apparatus shown in FIG. 5. Respective light receiving element arrays 12A and 12B comprise a plurality of light receiving elements formed on a substrate 14 at equal distances. While the stripe mask plate 13 is arranged to both light receiving element arrays 12A and 12B, the relation between the stripe mask plate 13 and the light receiving element arrays 12A or 12B is exactly alike so that for convenience only a construction of the light receiving element array 12A and the stripe mask plate 13 is explained hereinafter.

Figure 6B:
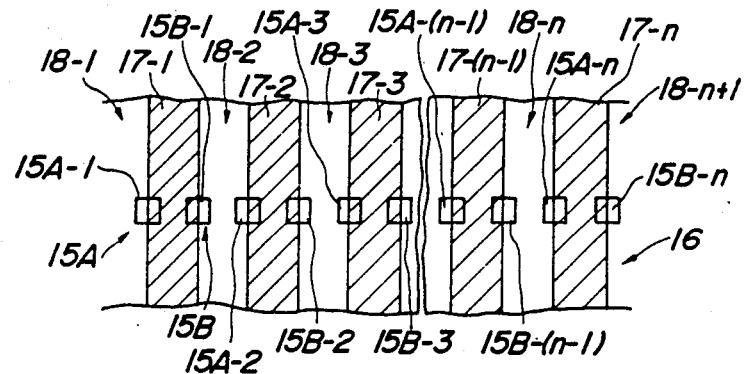
Figure 6C:
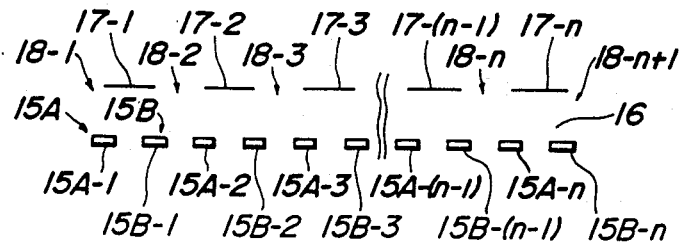

In this embodiment a plurality of light receiving elements forming the light receiving element array 12A are classified by odd numbered light receiving elements 15A-1 to 15A-n and even numbered light receiving elements 15B-1 to 15B-n in the array direction thereby forming respective light receiving element groups 15A and 15B and thus forming paired light receiving elements 15A-1, 15B-1; ...; 15A-n, 15B-n by adjacent light receiving elements of both groups. The stripe mask plate 13 comprises n stripe masks 17-1 to 17-n formed at places corresponding to respective paired light receiving elements on a transparent substrate 16 such as glass, a high polymer film or the like by vapor deposition, printing or the like, and openings 18 so constructed between stripe masks that as shown in FIGS. 6b and 6c light fluxes transmitted through first and second regions defined by a plane including the optical axis of the imaging lens 1 and perpendicular to the array direction of light receiving elements, that is, upper and lower parts of an exit pupil plane defined by the optical axis shown in FIG. 5, are principally incident upon two kinds of light receiving elements forming respective paired light receiving elements.

According to the apparatus thus constructed two kinds of light receiving elements forming respective paired light receiving elements, such as light receiving elements 15A-1 and 15B-1 have a directional characteristic of opposite directions as shown in FIG. 7 so that light receiving elements 15A-1 to 15A-n of the light receiving element group 15A receive principally light fluxes transmitted through the upper part of the imaging lens 1 defined by the optical axis thereof shown in FIG. 5 and light receiving elements 15B-1 to 15B-n of the light receiving element group 15B receive principally light fluxes transmitted through the lower part of the imaging lens 1. The illuminance distributions of the image projected upon respective light receiving element groups 15A and 15B are coincident with each other when the in-focused condition is obtained on the light receiving element array 12A, and are laterally shifted in the opposite directions to each other in accordance with forwardly- and backwardly-defocused directions when defocused condition is obtained, so that the lateral shift direction of the image and thus respective focus conditions such as in-focused condition and forwardly- and backwardly-defocused conditions on the light receiving element array 12A can be detected. This makes use of the advantages of the lateral shift detection method, resulting in a further enlargement of focus condition detecting range as compared with the image sharpness detection method explained in FIG. 1. When a predetermined focus condition detecting range is obtained, that is, a range capable of detecting focus condition with high precision due to use of the image sharpness detection method, if it is detected that sharpness of the image obtained on the light receiving element array 12A is equal to that of the light receiving element array 12B, this corresponds with the focal plane of the imaging lens 1.

For example, assuming that outputs of light receiving element groups A and B of the light receiving element arrays 12A and 12B is $A_n$ and $B_n$, respectively, an evaluation function $F_1$ representing sharpness of the image projected upon the light receiving element array 12A is obtained as follows:

$$F_1 = |(A_n + B_n) - (A_{n+1} + B_{n+1})|_{MAX} \quad (1)$$

In the same way, provided that an evaluation function representing sharpness of the image projected upon the light receiving element array 12B is $F_2$, as shown in FIG. 8a evaluation functions $F_1$ and $F_2$ each representing sharpness of the image are varied so as to obtain a peak value when projected images are imaged upon respective light receiving element arrays 12A and 12B, respectively.

An evaluation function $F_3$ representing lateral shift of the image projected upon the light receiving element array 12A is obtained as follows:

$$F_3 = \Sigma(|A_{n+1} - B_{n-1}| - |A_n - B_{n+1}|) \quad (2)$$

Provided that an evaluation function representing lateral shift of the image projected upon the light receiving element array 12B is $F_4$, as shown in FIG. 8b evaluation functions $F_3$ and $F_4$ are varied in such a manner that these functions take zero value at respective peak value positions of evaluation functions $F_1$ and $F_2$ based on the image sharpness detection method because of no lateral shift of the image and take values in which positive or negative sign is inverted in accordance with the defocused directions because of occurrence of lateral shift in the case of defocused position. The defocused directions of forwardly-defocused condition and backwardly-defocused condition are decided by the arithmetical operation of evaluation functions $F_3$ and $F_4$ obtained by the equation (2). When evaluation functions $F_3$ and $F_4$ have the same sign the defocused direction is decided by positive or negative sign and when evaluation functions $F_3$ and $F_4$ have the opposite sign the defocused direction and the in-focused condition are decided by using evaluation functions $F_1$ and $F_2$ obtained by the equation (1). According to the present invention as compared with the focus detection apparatus based on the conventional image sharpness detection method shown in FIG. 1, the focus condition can be detected over very wide drive range of the imaging optical system with high precision which is an advantage of the image sharpness detection method.

Figure 9:
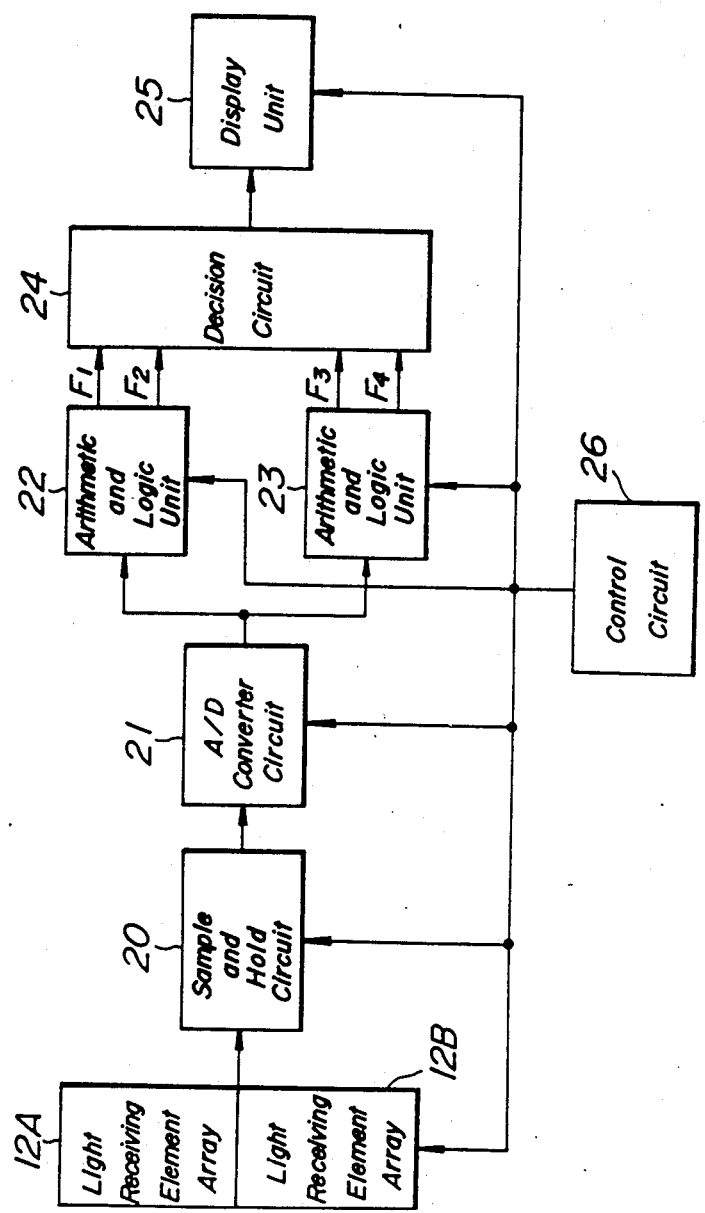
FIG. 9 is a block diagram showing a construction of a signal processing circuit for use in the focus condition detecting apparatus according to the present invention.

FIG. 9 is a block diagram showing one embodiment of a signal processing circuit capable of obtaining focus information representing the in-focused condition and the forwardly- and backwardly-defocused conditions based on output of respective light receiving element arrays 12A and 12B.

In this embodiment outputs of a plurality of respective light receiving elements of light receiving element arrays 12A and 12B are simultaneously processed by a sample and hold circuit 20. Values thus held are successively read out in arranged order of light receiving elements in accordance with output of respective light receiving element arrays 12A and 12B, and outputs thus read out are processed by an A/D converter circuit 21 to generate A/D converted signals which are successively supplied to first and second arithmetic and logic units 22 and 23. The first arithmetic and logic unit 22 arithmetically operates evaluation functions $F_1$ and $F_2$ representing sharpness of the image projected upon respective light receiving element arrays 12A and 12B based upon the equation (1) and the second arithmetic and logic unit 23 arithmetically operates valuation functions $F_3$ and $F_4$ representing lateral shift direction of the image projected upon respective light receiving element arrays 12A and 12B based upon the equation (2). Respective outputs of the arithmetic and logic units 22 and 23 are supplied to a decision circuit 24.

As described in FIG. 8, the defocused condition and the in-focused condition of the imaging optical system are decided by using the relation between evaluation functions $F_1$ to $F_4$ as follows. When evaluation values of both functions $F_3$ and $F_4$ have the same sign, that is, $F_3>0$, $F_4>0$, or $F_3<0$, $F_4<0$, the focus condition of the imaging optical system is decided as a defocused condition. In this case, evaluation functions $F_1$ and $F_2$ are not used. When evaluation values of functions $F_3$ and $F_4$ have the opposite sign, that is, $F_3<0$ and $F_4>0$, the focus condition of the imaging optical system is decided as the forwardly-defocused condition in the case of $F_1>F_2$, the backwardly-defocused condition in the case of $F_1<F_2$, and the in-focused condition in the case of $F_1=F_2$, respectively.

That is, in the range in the forwardly-defocused direction and the backwardly-defocused direction wherein evaluation functions $F_1$ and $F_2$ are incapable of being compared with each other, a defocused condition may easily be decided by positive and negative signs of evaluation functions $F_3$ and $F_4$ both having the same sign. In the range in which evaluation functions $F_3$ and $F_4$ have the opposite sign, an in-focused or defocused condition may be decided with high precision by comparing evaluation functions $F_1$ and $F_2$ with each other.

The output signals of the decision circuit 24 which represent results obtained by the above described decision of evaluation functions $F_1$, $F_2$, $F_3$ and $F_4$ are displayed in a display unit 25. Respective operations of light receiving element arrays 12A, 12B, the sample and hold circuit 20, A/D converter circuit 21, first and second arithmetic and logic units 22 and 23, the decision circuit 24 and the display unit 25 are controlled by a control circuit 26.

Figure 10A:
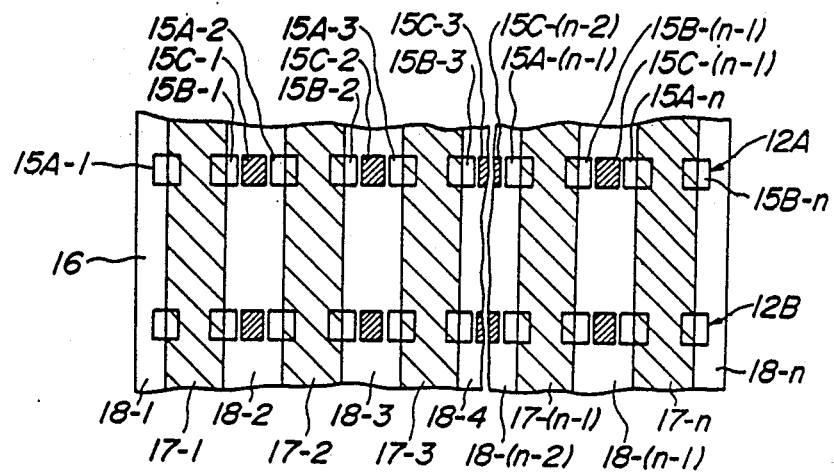
FIGS. 10a and 10b are a plan view and a side view, respectively, of another construction of a stripe mask and a light receiving element array shown in FIG. 5 and a relative position therebetween.
Figure 10B:
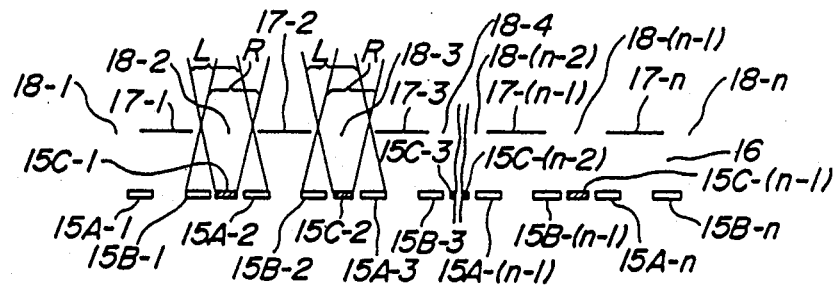

FIGS. 10a and 10b show a second embodiment of the focus condition detecting apparatus according to the present invention.

In FIGS. 10a and 10b, like elements are designated by the same reference characters as that of FIG. 6 and its explanation is omitted.

In this embodiment, as shown in FIGS. 10a and 10b, the light receiving element array 12A comprises a plurality of paired light receiving elements 15A-1, 15B-1; ...; 15A-n, 15B-n, and a plurality of light receiving elements 15C-1 to 15C-n which are disposed between respective paired light receiving elements, respectively, and arranged in a straight manner.

The stripe mask plate 13 comprises the transparent substrate 16 such as glass, a high polymer film or the like, and a plurality of stripe masks 17-1 to 17-n formed on the surface thereof by vapor deposition, printing or the like, these stripe masks forming a plurality of openings 18-1 to 18-n corresponding to respective paired light receiving elements 15A-1, 15B-1; ...; 15A-n, 15B-n. The relative positions of the openings 18-1 to 18-n and respective paired light receiving elements 15A-1, 15B-1; ...; 15A-n, 15B-n is shown in FIG. 10b. That is, respective openings 18-1 to 18-n are disposed in such a manner that light fluxes R and L transmitted through first and second regions which are defined by a plane perpendicular to the array direction of light receiving elements and including the optical axis of the imaging lens 1, that is, upper and lower parts of the exit pupil plane which are defined by the optical axis in FIG. 5, are made incident upon two light receiving elements forming respective paired light receiving elements 15A-1, 15B-1; ...; 15A-n, 15B-n, respectively, and both light fluxes R and L are made incident upon respective light receiving elements 15C-1 to 15C-n disposed between respective paired light receiving elements.

According to the apparatus thus constructed, two kinds of light receiving elements forming respective paired light receiving elements, such as light receiving elements 15A-1 and 15B-1 have a directional characteristic of opposite directions as shown in FIG. 7 so that light receiving elements 15A-1 to 15A-n of the light receiving element group 15A receive principally light fluxes transmitted through the upper part of the imaging lens 1 defined by the optical axis thereof shown in FIG. 5 and light receiving elements 15B-1 to 15B-n of the light receiving element group 15B receive principally light fluxes transmitted through the lower part of the imaging lens 1. The illuminance distributions of the image projected upon respective light receiving element groups 15A and 15B are coincident with each other when in-focused condition is obtained on the light receiving element array 12A, and are laterally shifted in the opposite direction to each other in accordance with forwardly- and backwardly-defocused directions when defocused condition is obtained, so that the lateral shift direction of the image and thus respective focus conditions such as in-focused condition and forwardly- and backwardly-defocused conditions on the light receiving element array 12A can be detected. This makes use of the advantages of the lateral shift detection method resulting in a further enlargement of focus condition detecting range as compared with the image sharpness detection method explained in FIG. 1. Light receiving element groups 15C-1 to 15C-n, disposed between respective paired light receiving elements of the light receiving element array 12A, receive light flux which is not subjected to the exit pupil division so that images projected upon the light receiving element groups 15C-1 to 15C-n have no lateral shift thereby obtaining sharpness in accordance with focus conditions of the imaging lens 1 upon the light receiving element array 12A.

In the focus condition detecting apparatus according to the present invention, the above described lateral shift detection and the image sharpness detection are performed on the other light receiving element array 12B thereby detecting focus conditions based on lateral shift information and image sharpness information which is obtained by respective light receiving element arrays 12A and 12B.

Provided that outputs of light receiving element groups 15C-1 to 15C-n disposed between respective paired light receiving elements 15A-1, 15B-1; ... ; 15A-n, 15B-n of the light receiving element arrays 12A and 12B are $C_n$, an evaluation function $F'_1$ representing sharpness of the image projected upon the light receiving element array 12A may be obtained as follows:

$$F_1 = |C_n - C_{n+1}|_{MAX} \quad (3)$$

In the same way, the evaluation function representing sharpness of the image projected upon the light receiving element array 12B may be obtained as $F'_2$. As shown in FIG. 8a, evaluation functions $F'_1$ and $F'_2$ vary respectively in such a manner that when projected image is imaged upon the respective light receiving element arrays 12A and 12B the evaluation value becomes a peak value.

Assuming that outputs of light receiving element group 15A-1 to 15A-n consisting of one group of light receiving elements of respective paired light receiving elements are $A_n$, and outputs of light receiving element group 15B-1 to 15B-n consisting of the other light receiving elements are $B_n$, an evaluation function $F'_3$ representing lateral shift of the image projected upon the light receiving element 12A can be obtained as follows:

$$F_3 = \Sigma(|A_{n+1} - B_{n-1}| - |A_n - B_{n+1}|) \quad (4)$$

Provided that an evaluation function representing lateral shift of the image projected upon the light receiving element array 12B is $F'_4$, as shown in FIG. 8b evaluation functions $F'_3$ and $F'_4$ are varied in such a manner that these functions take zero value at respective peak value positions of evaluation functions $F'_1$ and $F'_2$ based on the image sharpness detection method because of no lateral shift of the image and take values in which positive or negative sign is inverted in accordance with the defocused directions because of occurrence of lateral shift in the case of defocused position. The defocused directions of forwardly-defocused condition and backwardly-defocused condition are decided by the arithmetical operation of evaluation functions $F'_3$ and $F'_4$ obtained by the equation (4). When evaluation functions $F'_3$ and $F'_4$ have the same sign the defocused direction is decided by positive or negative sign and when evaluation functions $F'_3$ and $F'_4$ have the opposite sign the defocused direction and the in-focused condition are decided by using evaluation functions $F'_1$ and $F'_2$ obtained by the equation (3). According to the present invention as compared with the focus detection apparatus based on the conventional image sharpness detection method shown in FIG. 1, the focus condition can be detected over very wide drive range of the imaging optical system with high precision which is an advantage of the image sharpness detection method.

In this embodiment, the signal processing circuit shown in FIG. 9 is again utilized as a signal processing circuit capable of obtaining focus information representing the in-focused condition and the forwardly- and backwardly-defocused conditions based on output of respective light receiving element arrays 12A and 12B.

In this embodiment, outputs of a plurality of respective light receiving elements of light receiving element arrays 12A and 12B are simultaneously processed by the sample and hold circuit 20. Values thus held are successively read out in arranged order of light receiving elements in accordance with output of respective light receiving element arrays 12A and 12B, and outputs thus read out are processed by the A/D converter circuit to generate A/D converted signals which are successively supplied to first and second arithmetic and logic units 22 and 23. The first arithmetic and logic unit 22 arithmetically operates evaluation functions $F'_1$ and $F'_2$ representing sharpness of the image projected upon respective light receiving element arrays 12A and 12B based on the equation (3) by using outputs $C_n$ and $C'_n$ of the light receiving element group consisting of light receiving elements disposed between adjacent paired light receiving elements of respective light receiving element arrays 12A and 12B. The second arithmetic and logic unit 23 arithemetically operates evaluation functions $F'_3$ and $F'_4$ representing lateral shift direction of the image projected upon respective light receiving element arrays 12A and 12B based upon the equation (4) by using outputs $A_n$, $B_n$ and $A'_n$, $B'_n$ of the two light receiving element groups consisting of respective light receiving elements which constitute respective paired light receiving elements of respective light receiving element arrays 12A and 12B. Respective outputs of the arithmetic and logic units 22 and 23 are supplied to the decision circuit 24.

As again described in FIG. 8, the defocused condition and the in-focused condition of the imaging optical system are decided by using the relation between evaluation functions $F'_1$ to $F'_4$ as follows. When evaluation values of both functions $F'_3$ and $F'_4$ have the same sign, that is, $F'_3<0$, $F'_4>0$, or $F'_3<0$, $F'_4<0$, the focus condition of the imaging optical system is decided as a defocused condition. In this case evaluation functions $F'_1$ and $F'_2$ are not used. When evaluation values of functions $F'_3$ and $F'_4$ have the opposite sign, that is, $F'_3<0$ and $F'_4>0$, the focus condition of the imaging optical system is decided as the forwardly-defocused condition in the case of $F'_1>F'_2$, the backwardly-defocused condition in the case of $F'_1<F'_2$, and the in-focused condition in the case of $F'_1=F'_2$, respectively.

That is, in the range in the forwardly-defocused direction and the backwardly-defocused direction wherein evaluation functions $F'_1$ and $F'_2$ are incapable of being compared with each other, a defocused condition may easily be decided by positive and negative signs of evaluation functions F'₃ and F'₄ both having the same sign. In the range in which evaluation functions F'₃ and F'₄ have the opposite an in-focused or defocused condition sign, may be decided with high precision by comparing evaluation functions F'₁ and F'₂ with each other.

The output signals of the decision circuit 24 which represent results obtained by the above described decision of evaluation functions F'₁, F'₂, F'₃ and F'₄ are displayed in the display unit 25. Respective operations of light receiving element arrays 12A, 12B, the sample and hold circuit 20, A/D converter circuit 21, first and second arithmetic and logic units 22 and 23, the decision circuit 24 and the display unit 25 are controlled by the control circuit 26.

A further embodiment of the light flux dividing system 13 for use in the focus condition detecting apparatus according to the present invention is shown in FIG. 11. In this embodiment the light flux dividing system 13 comprises the transparent substrate 16 such as glass, a high polymer film, or the like, n stripe masks 17-1 to 17-n provided on the surface of the substrate 16 opposite to the imaging optical system side and at places corresponding to respective paired light receiving elements as a first light shielding member, these stripe masks forming a plurality of comparatively large openings 18-1 to 18-n, and (2n+1) stripe masks 28-1 to 28-(2n+1) provided on the surface of the substrate 16 opposite to the side of the light receiving element array 12A as a second light flux shielding member, by utilizing vapor deposition, printing or the like, these stripe masks 28-1 to 28-(2n+1) forming a plurality of openings 29-1 to 29-(2n+2) having a comparatively smaller width than length, the length corresponding to the array direction of respective light receiving elements. The use of such a light flux shielding member 13 ensures as shown in FIG. 12, that even if the optical adjustment of the light flux shielding member 13 and the light receiving element array 12A is slightly shifted in the array direction of light receiving elements respective light receiving areas of respective light receiving elements opposite to respective openings 29-1 to 29-(2n+2) are not changed, and thus the balance of quantity of light incident upon the light receiving element groups 15A and 15B is not changed, thereby performing optical adjustment of the light flux shielding member 13 and the light receiving element array 12A and resulting in the possibility the detecting focus condition with high precision. For example, if the position of the light flux shielding member 13 shown in FIGS. 5 and 6 is slightly shifted in the array direction to the right side of the light receiving element array 12A, for example, the light receiving areas of light receiving elements 15A-1 to 15A-n are extended uniformly and the light receiving areas of light receiving elements 15B-1 to 15B-n are reduced uniformly so that outputs of light receiving element groups 15A and 15B become remarkably unbalanced resulting in the impossibility of detecting focus condition with high precision. It is therefore necessary that the light receiving element array 12A and the light flux shielding member 13 be optically adjusted with comparatively high precision.

It is to be understood that the present invention is not limited in its application to the details of construction and arrangement of parts illustrated in the accompanying drawings, since the present invention is capable of other embodiments and of being practiced or carried out in various ways. Also it is to be understood that the phraseology or terminology employed herein is for the purpose of description and not of limitation. For example, the lenticular lens or microlens array may be used as the light flux dividing system. Moreover, both the image sharpness information and the image lateral shift information may be used over the whole focus detection region and the image lateral shift information may also be used for focus detection near the in-focused position.

What is claimed is:

1. An apparatus for detecting a defocused condition of an imaging optical system comprising:

a light receiving element array disposed at or near a predetermined focal plane and having a plurality of light receiving elements;

a light flux dividing optical system arranged in the light path between the light receiving element array and the imaging optical system and constructed in such a manner that respective light flux transmitted through first and second areas of the light flux dividing optical system are divided by a plane including an optical axis of the light receiving element array upon which the light flux is incident;

means for obtaining evaluation functions $F_3$ and $F_4$, each representing an image lateral shift, by processing outputs of respective first and second light receiving element groups of the light receiving element array wherein the evaluation functions of $F_3$ and $F_4$ are obtained by the following equations:

$$F_3(F_4) = \Sigma(|A_{n+1} - B_{n-1}| - |A_n - B_{n+1}|)$$

where $A_n$ is the output of odd numbered elements of said respective first and second light receiving element groups of the light receiving element array, and $B_n$ is the output of even numbered elements of said respective first and second light receiving element groups of the light receiving element array; and means for deciding the defocused condition using the evaluation functions $F_3$ and $F_4$.

2. An apparatus for detecting a defocused condition of an imaging optical system as claimed in claim 1, wherein the first light receiving element group comprising light receiving elements which receive the light flux transmitted through the first area of the imaging optical system and the second light receiving element group comprises light receiving elements which receive the light flux transmitted through the second area of the imaging optical system.

3. An apparatus for detecting a defocused condition of an imaging optical system as claimed in claim 1, wherein the light flux dividing optical system is a light shielding member having a plurality of openings.

4. An apparatus for detecting a defocused condition of an imaging optical system as claimed in claim 3, wherein the light shielding member is a stripe mask plate comprising a transparent substrate and a plurality of first stripe masks provided on the light incident surface of the substrate at substantially equal intervals in such a manner that intervals between said first stripe masks form a plurality of openings for making light flux, transmitted through said first and second areas of the light flux dividing optical system, incident upon adjacent light receiving elements of the light receiving element array.

5. An apparatus for detecting a defocused condition of an imaging optical system as claimed in claim 4, wherein the spripe mask plate further comprising a plurality of second stripe masks situated between successive light receiving elements of the light receiving element array on the surface of the transparent substrate opposite to the side of the first stripe mask at substantially equal intervals, said surface being very near the light receiving element array, in such a manner that intervals between the second stripe masks for a plurality of openings for making light flux divided by the first stripe mask incident upon the adjacent paired light receiving elements.

* * * * *